Patented Mar. 13, 1923.

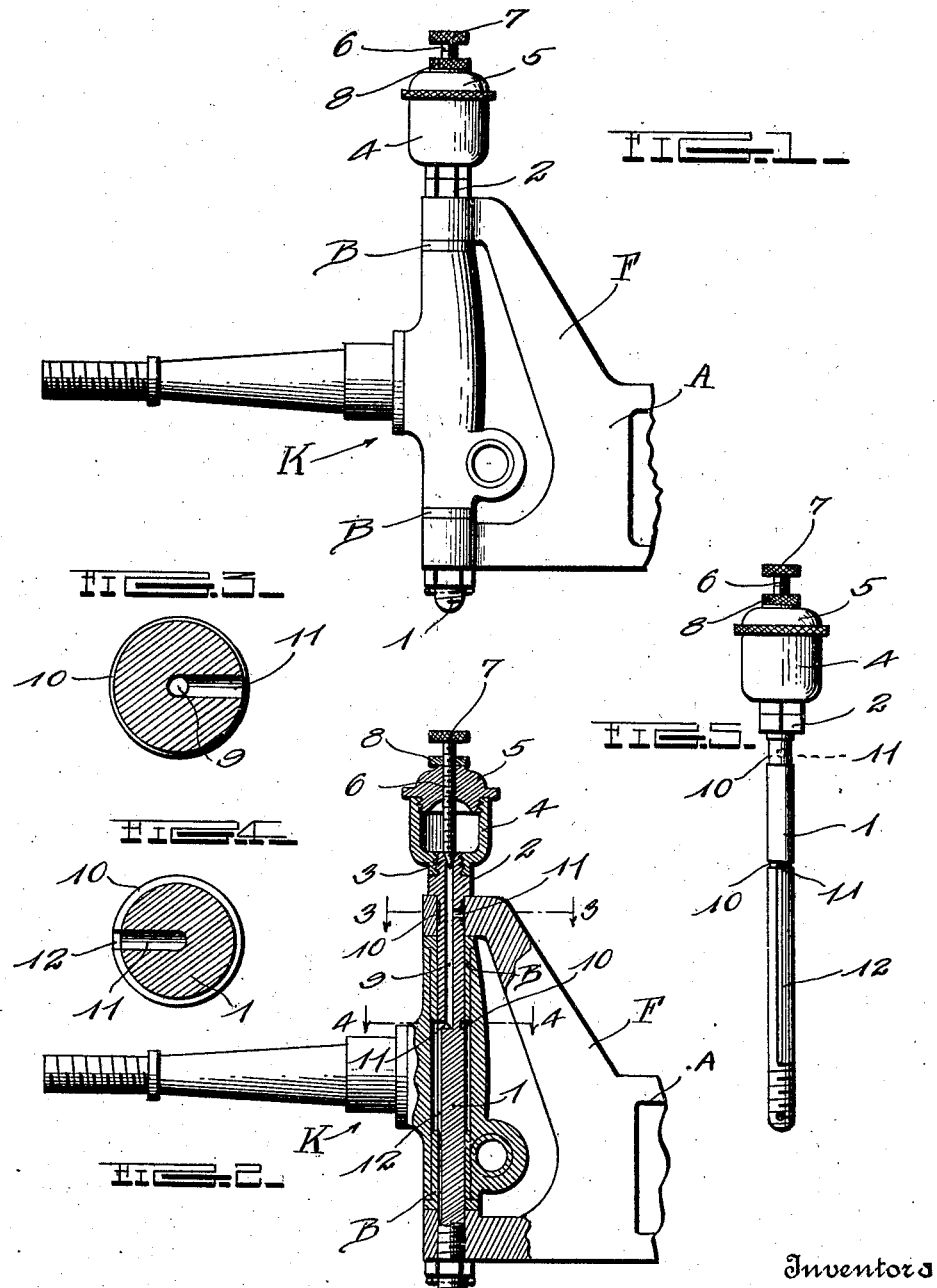

1,448,685

UNITED STATES PATENT OFFICE.

JOHN G. BINNINGTON, OF ST. LOUIS, AND HARRY E. MAHAN, OF INDEPENDENCE, MISSOURI.

SPINDLE BOLT.

Application filed April 14, 1922. Serial No. 552,741.

*To all whom it may concern:*

Be it known that we, JOHN G. BINNINGTON and HARRY E. MAHAN, citizens of the United States, residing, respectively, at St. Louis and at Independence, in the county of Jackson and State of Missouri, have invented certain new and useful Improvements in Spindle Bolts; and we do declare the following to be a full, clear, and exact description of the invention, such as will enable others skilled in the art to which it appertains to make and use the same.

This invention relates to an improved spindle bolt adapted to be associated with the steering knuckle of an automobile steering gear.

The principal object of the invention is to produce a self-oiling spindle bolt to prevent wear of the bushings by securing proper lubrication.

Many of the spindle bolts now used are not provided with means for constantly keeping the parts with which it is associated properly lubricated at all times. A majority of spindle bolts are solid while others are formed with one or more oil passages which are so located that they become readily filled with dust and dirt and grit. Hence, effective lubrication is practically impossible and in many instances it has been found that the spindle bolts frequently become crystallized and break because of the lack of lubrication.

It is therefore my aim to produce a spindle bolt formed with a bore extending from its upper end to a point adjacent its center and forming an oil passage, this passage having small radial ports leading to the surface of the bolt for supplying oil thereto. A suitable reservoir is supported on the upper end of the bolt and feeds a lubricant through the passage, there being means associated with this reservoir for controlling the amount of oil permitted to enter the passages. Both of the radial ports are so located that after the bolt is in place, they are rendered substantially dust-proof.

Other objects and advantages of the invention will be apparent during the course of the following description.

In the accompanying drawings forming a part of this specification and in which like numerals are employed to designate like parts throughout the same:

Figure 1 is an elevational view of one end of an automobile axle showing the steering knuckle and the improved spindle bolt connecting the same to the axle.

Figure 2 is a similar view with portions broken away and shown in section to disclose the construction more clearly.

Figures 3 and 4 are enlarged transverse sections taken substantially on the planes of the lines 3—3 and 4—4 respectively of Fig. 2, showing the spindle bolt only.

Figure 5 is a detail elevation of the improved spindle bolt.

In the drawings, the letter A designates an automobile axle having a yoke or fork F on which the steering knuckle K is supported. The improved spindle bolt 1 passes through the bearing openings in the yoke and tubular vertically disposed part of the steering knuckle to connect the latter with the fork. This bolt, as is usual, is formed at its upper end with an integral nut or shoulder 2 resting against the upper arm of the yoke and the portion of the bolt above this nut is screw-threaded as indicated at 3. A cup 4 is threaded onto this part 3 and includes a removable closure 5 through which a screw-threaded needle valve 6 passes. This valve is formed on its outer end with a head 7 to permit it to be grasped by the fingers and rotated to open or close it. If desired, a lock-nut 8 may be employed for holding the valve in a set position. As before indicated, the bolt is formed with a central longitudinal bore 9 which extends from its opposite end to a point adjacent its center and this bore constitutes an oil passage. At its upper end, it is enlarged slightly to accommodate and provide a valve seat for the conical inner end of the valve 6. At points between its ends, the bolt is formed with circumferential grooves 10 and short radial ports 11 extend from these grooves and afford communication between the grooves and bore so as to permit oil to be supplied to the latter into the grooves for oiling the bushings B and the other parts with which the bolt co-acts. To insure effective distribution of the lubricant, the bolt is formed on its exterior surface with a vertical groove 12 which extends from the lowermost or central groove 10 to a point adjacent the bottom of the bolt. This serves to effectively lubricate the lower bushing and other adjacent parts of the axle and steering knuckle.

Assuming that the cup has been filled with oil, it will be seen that turning of the valve 6 in one direction will permit oil to flow from the cup through the several passages and into the circumferential and vertical grooves. Hence, the oil will gravitate through the bore, ports and grooves and will thoroughly lubricate the outer surface of the bolt and the parts which it contacts. Consequently, the life of said parts will be greatly lengthened and need not be frequently replaced as is ordinarily the case, due to the lack of proper lubrication.

In practice, the bolts will be made of case hardened steel carbonized and ground and the oil cup will be made of brass and nickel plated to render the new article very artistic in appearance. A bolt of this construction possessing the effective lubricating qualities will not only prevent wear of the bushings, but will render steering easier and will eliminate excessive and undue wiggling of the wheels.

From the foregoing description, it is evident that we have evolved and produced a unique self-oiling spindle bolt which is a decided improvement upon bolts of this class now in use. The several features and advantages of the same have been made clear and it is thought that persons familiar with bolts of this class will doubtless be able to obtain a clear understanding of the invention. It is therefore thought unnecessary to enter a more lengthy description.

Since probably the best results may be obtained with the construction and arrangement herein shown and described, this is taken as the preferred embodiment of the invention. However, we wish it to be understood that minor changes coming within the scope of the invention as claimed may be resorted to if desired.

We claim:

A self-oiling spindle bolt having a centrally disposed longitudinal bore extending from its upper end to a point adjacent its center, circumferential grooves formed in the surface of the bolt, one at the center and the other one at the upper end, radial ports leading from said bore to said grooves, a vertical groove formed in the surface of the bolt and extending from the central circumferential groove to a point adjacent the lower end of said bolt, a shoulder integral with the upper part of the bolt, the shoulder being disposed just below the upper extremity thereof, the portion of the bolt extending beyond said shoulder being screw-threaded, an oil cup having a threaded neck engaged with the threaded upper end of said bolt, a screw threaded needle valve threaded through the cup and co-operative with the discharge opening thereof for controlling the passage of oil from the cup into the bore, and a lock nut for holding the valve in various adjusted positions.

In testimony whereof we have hereunto set our hands.

JOHN G. BINNINGTON.
HARRY E. MAHAN.